(12) United States Patent
Chee (10) Patent No.: US 7,271,383 B2
(45) Date of Patent: Sep. 18, 2007

(54) SCANNING SYSTEM WITH FEEDBACK FOR A MEMS OSCILLATING SCANNER

(75) Inventor: Christopher G. Chee, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 122 days.

(21) Appl. No.: 10/916,907

(22) Filed: Aug. 11, 2004

(65) Prior Publication Data
US 2006/0033021 A1 Feb. 16, 2006

(51) Int. Cl.
*H01J 3/14* (2006.01)
*G02B 26/08* (2006.01)
*B41J 2/47* (2006.01)

(52) U.S. Cl. ............... 250/235; 250/216; 250/236; 359/216; 347/235

(58) Field of Classification Search ........ 250/234–236, 250/216, 277.26; 347/250, 224, 233–235, 347/256, 258–260, 225, 261; 358/514, 483, 358/481, 1.7, 480; 359/196, 197, 204, 205, 359/207, 212, 213, 216–221, 226, 223
See application file for complete search history.

(56) References Cited

U.S. PATENT DOCUMENTS

| | | | |
|---|---|---|---|
| 4,251,825 A | | 2/1981 | Mikami et al. |
| 4,587,531 A | | 5/1986 | Dangler |
| 4,691,212 A | * | 9/1987 | Solcz et al. .................. 347/257 |
| 4,800,271 A | | 1/1989 | Blais |
| 5,610,651 A | | 3/1997 | Yamakawa et al. |
| 5,844,591 A | * | 12/1998 | Takamatsu et al. .......... 347/235 |
| 6,256,131 B1 | * | 7/2001 | Wine et al. .................. 359/199 |
| 6,268,876 B1 | | 7/2001 | Ozaki et al. |
| 7,102,805 B2 | * | 9/2006 | Nomura et al. .............. 359/212 |
| 2001/0028387 A1 | * | 10/2001 | Maeda ......................... 347/232 |

\* cited by examiner

*Primary Examiner*—Que Tan Le
*Assistant Examiner*—Pascal M. Bui-Pho
(74) *Attorney, Agent, or Firm*—Luedeka, Neely & Graham, P.C.

(57) ABSTRACT

A scanning system for a printer or scanner that has a beam source that produces a light beam at a point of origin and has a scanning mirror that sweeps the light beam from a position "A" to a position "B." A lens receives the light beam from the scanning mirror and directs the light beam as a scanning beam to an image plane surface. A first synchronizing mirror intercepts and reflects a light ray to a photo detection system when the scanning beam is at a position "A'" that is in the vicinity of position "A" and between position "A" and "B". A second synchronizing mirror intercepts a light ray when the scanning beam is at a position "B'" that is in the vicinity of position "B" and between position "A" and "B", and reflects the light ray to a folding mirror that reflects the light ray to the photo detection system. In some configurations two photo detection systems are used in lieu of the folding mirror. In some instances, the lens is a focusing lens and when the scanning beam is at position "A'" and when the scanning beam is at position "B'", equal optical path lengths are established between (1) the point of origin and the photo detection system and (2) the point of origin and virtually to the image plane surface such that the light ray arriving at the photo detection system is well focused.

26 Claims, 6 Drawing Sheets

SCANNING SYSTEM WITH FEEDBACK FOR A MEMS OSCILLATING SCANNER

FIELD

This invention relates to the field of light beam scanners. More particularly, this invention relates to mechanisms to control and synchronize bi-directional oscillating scanning devices.

BACKGROUND

Optical printers and scanners typically incorporate a mechanism to direct a light beam in a pattern that scans across the surface of an image plane surface. Often the light beam is a laser beam. For printers, the image plane surface is typically the outer cylindrical surface of a photo-sensitive drum. For scanners, the image plane surface is typically a piece of paper being scanned. Generally the light beam sweeps in one plane, called the horizontal plane, while the image plane moves in an orthogonal (vertical) plane. In cases where the image plane surface is a photo-sensitive drum, movement in the vertical plane is achieved by rotating the drum around its cylindrical axis.

In many optical systems the horizontal scanning motion of the light beam is achieved by reflecting the light beam off a moving mirror. Often the mirror is a series of planar surfaces on a polygonal wheel that rotates. In such systems, the light beam is focused at an oblique angle toward the axis of rotation of the mirror, and the light beam is deflected in a linear scanning mode by each planar mirror surface of the polygon as the mirror spins. In systems where the image plane surface is simultaneously moving in the vertical plane, the horizontal light scanning plane is tilted somewhat from the vertical recording medium plane such that the trace of the light scan is substantially orthogonal to the direction of movement of the of the image plane surface in the vertical plane.

In order to write information as in a printer, the ray of the light beam is typically modulated as it scans. In order to read information as in a scanner, the intensity of the reflected beam is typically monitored. To achieve an accurate recording of the image as successive scan lines are written on or read from the image plane surface, it is essential to synchronize the modulation of each scan of light beam with the modulation of the previous scans that are creating the image. Typically this synchronization is achieved by optically intercepting the light beam with one or more photo detectors at the start of each scan line. The detection of light beam by the photo detector creates a start of scan pulse that is used to synchronize the start of modulation of the light beam for each successive scan line.

Historically, in many optical scanning and printing systems, scanning occurs in only one direction. As a result, it has generally been sufficient to intercept the light beam on one side (the starting side) of each successive scan. However, optical printer and scanner users are continually demanding increases in processing speed. As speeds increase accurate synchronization of modulation (for printers) or detection (for scanners) of the light beam becomes more difficult using only a start-of-scan pulse. Also, in many applications it is desirable to provide bi-directional light beam scanning capability. Existing technology does not adequately address all the needs for synchronizing light beam modulation for high speed or bi-directional scanning or printing. What is needed is an improved means that has the ability to detect both the start and the end of each scan of the light beam. Also needed is an improved means of synchronizing bi-directional scanning systems.

SUMMARY

The above and other needs are met by a scanning system that has a beam source that produces a light beam and a scanning mirror that receives the light beam from the beam source and sweeps the light beam from a position "A" to a position "B". A lens receives the light beam from the scanning mirror as the scanning mirror sweeps the light beam from position "A" to position "B" and directs the light beam as a scanning beam to an image plane surface. A photo detection system that has at least one photo detector and has a minimum light ray threshold detection level is provided. A first synchronizing mirror is used and the first synchronizing mirror is positioned to intercept and reflect at least a portion of the scanning beam as a synchronizing light ray when the light beam is at a position "A'" that is in the vicinity of position "A" and that is between position "A" and position "B" such that when the light beam is at position "A'" the first synchronizing mirror intercepts a first light ray of the scanning beam and reflects at least a portion of the first light ray as a second light ray of the scanning beam to the photo detection system, where the intensity of the second light ray of the scanning beam is at least equal to the minimum light ray threshold detection level of the photo detection system. A second synchronizing mirror is also used, and the second synchronizing mirror is positioned to intercept and reflect at least a portion of the scanning beam as a synchronizing light ray when the light beam is at a position "B'" that is in the vicinity of position "B" and that is between position "A" and position "B" such that when the light beam is at position "B'" the second synchronizing mirror intercepts a third light ray of the scanning beam and reflects at least a portion of the third light ray as a fourth light ray of the scanning beam to a folding mirror that is positioned to reflect at least a portion of the fourth light ray as a fifth light ray of the scanning beam to the photo detection system, where the intensity of the fifth light ray of the scanning beam is at least equal to the minimum light ray threshold detection level of the photo detection system. An electronic circuit is provided to generate an electronic signal when the photo detection system detects a light ray that is at least equal to the minimum light ray threshold detection level of the photo detection system.

In an alternate embodiment, the scanning system has a beam source producing a light beam and a scanning mirror that receives the light beam from the beam source and sweeps the light beam from a position "A" to a position "B". A lens is provided to receive the light beam from the scanning mirror as the scanning mirror sweeps the light beam from position "A" to position "B" and directs the beam as a scanning beam to an image plane surface. A single photo detector having a minimum light ray threshold detection level is used. A first synchronizing mirror is positioned to intercept and reflect at least a portion of the scanning beam when the light beam is at a position "A'" that is in the vicinity of position "A" and that is between position "A" and position "B" such that when the light beam is in position "A'" the first synchronizing mirror intercepts a first light ray of the scanning beam and reflects at least a portion of the first light ray as a second light ray of the scanning beam to the photo detector without passing through the lens, where the intensity of the second light ray of the scanning beam is at least equal to the minimum light ray threshold detection level of the photo detector. A second synchronizing mirror is positioned to intercept and reflect at least a portion of the scanning beam when the light beam is at a position "B'" that is in the vicinity of position "B" and that is between position "A" and position "B" such that when the light beam is at position "B'" the second synchronizing mirror intercepts a third light ray of the scanning beam and reflects at least a portion of the third light ray as a fourth light ray of the scanning beam to the photo detector, where the intensity of the fourth light ray of the scanning beam is at least equal to the minimum light ray threshold detection level of the photo detector. An electronic circuit generates an electronic signal when the photo detector detects a light ray that is at least equal to the minimum light ray threshold detection level of the photo detector.

Another embodiment incorporates a beam source producing a light beam. A scanning mirror receives the light beam from the beam source and sweeps the light beam from a position "A" to a position "B". A lens receives the light beam from the scanning mirror as the scanning mirror sweeps the light beam from position "A" to position "B" and directs the light beam as a scanning beam to an image plane surface. A plurality of photo detectors are provided, each having its own minimum light ray threshold detection level. A first synchronizing mirror is positioned to intercept and reflect at least a portion of the scanning beam as a synchronizing light ray when the light beam is at a position "A'" that is in the vicinity of position "A" and that is between position "A" and position "B", such that when the light beam is in position "A'" the first synchronizing mirror intercepts a first light ray of the scanning beam and reflects at least a portion of the first light ray as a second light ray of the scanning beam to a first photo detector, where the intensity of the second light ray of the scanning beam is at least equal to the minimum light ray threshold detection level of the first photo detector. A second synchronizing mirror is positioned to intercept and reflect at least a portion of the scanning beam as a synchronizing light ray when the light beam is at a position "B'" that is in the vicinity of position "B" and that is between position "A" and position "B" such that when the light beam is at position "B'" the second synchronizing mirror intercepts a third light ray of the scanning beam and reflects at least a portion of the third light ray as a fourth light ray of the scanning beam to a second photo detector, where the intensity of the fourth light ray of the scanning beam is at least equal to the minimum light ray threshold detection level of the second photo detector. At least one synch focusing lens is provided to intercept at least one synchronizing light ray and focus at least one synchronizing light ray onto at least one photo detector. An electronic circuit is included to generate an electronic signal when a photo detector detects a light ray that is at least equal to the minimum light ray threshold detection level of the photo detector.

In a different configuration, the scanning system has a beam source that produces a light beam at a light beam point of origin, and a scanning mirror receives the light beam from the beam source and sweeps the light beam from a position "A" to a position "B". A lens receives the light beam from the scanning mirror as the scanning mirror sweeps the light beam from position "A" to position "B" and directs the light beam as a scanning beam to an image plane surface. A plurality of photo detectors are provided, each having its own minimum light ray threshold detection level. A first synchronizing mirror is positioned to intercept and reflect at least a portion of the scanning beam when the light beam is at a position "A'" that is in the vicinity of position "A" and that is between position "A" and position "B" such that when the light beam is in position "A'" the first synchronizing mirror intercepts a first light ray of the scanning beam and reflects at least a portion of the first light ray as a second light ray of the scanning beam to a first photo detector, where the intensity of the second light ray of the scanning beam is at least equal to the minimum light ray threshold detection level of the first photo detector. A second synchronizing mirror is positioned to intercept and reflect at least a portion of the scanning beam when the light beam is at a position "B'" that is in the vicinity of position "B" and that is between position "A" and position "B" such that when the light beam is at position "B'" the second synchronizing mirror intercepts a third light ray of the scanning beam and reflects at least a portion of the third light ray as a fourth light ray of the scanning beam to a second photo detector, where the intensity of the fourth light ray of the scanning beam is at least equal to the minimum light ray threshold detection level of the second photo detector. A first recording optical path length is established as measured from the light beam point of origin to the scanning mirror and then through the lens and then virtually to the image plane surface when the light beam is at position "A'", and a second recording optical path length is established as measured from the light beam point of origin to the scanning mirror and then through the lens and then virtually to the image plane surface when the light beam is at position "B'". A first synchronizing optical path length is established as measured from the light beam point of origin to the scanning mirror and then to the first synchronizing mirror and then to the first photo detector when the light beam is at position "A'", and a second synchronizing optical path length is established as measured from the light beam point of origin to the scanning mirror and then to the second synchronizing mirror and then to the second photo detector when the light beam is at position "B'". The first recording optical path length is substantially equal to the first synchronizing optical path length and the second recording optical path length is substantially equal to the second synchronizing optical path length such that the focused scanning beam is both focused on the photo detector and virtually focused on the image plane surface. The scanning system further comprises an electronic circuit that generates an electronic signal when a photo detector detects a light ray that is at least equal to the minimum light ray threshold detection level of the photo detector.

In a further alternate implementation, the scanning system has a beam source producing a light beam having a point of origin and a scanning mirror that receives the light beam from the beam source and oscillates the light beam between a position "A" and a position "B". A focusing lens is provided to receive the light beam from the scanning mirror as the scanning mirror oscillates the light beam between position "A" and position "B" and to focus the beam as a focused scanning beam to an image plane surface. A photo detection system is provided having at least one photo detector with each photo detector having a minimum light ray threshold detection level. A first synchronizing mirror is positioned to intercept and reflect at least a portion of the focused scanning beam when the light beam is at a position "A'" that is in the vicinity of position "A" and is between position "A" and position "B". The position is such that as the light beam approaches position "A" from position "B", when the light beam is at position "A'" the first synchronizing mirror intercepts a first light ray of the focused scanning beam and reflects at least a portion of the first light ray as a second light ray of the focused scanning beam to a photo detector, the second light ray having an intensity at least equal to the minimum light ray threshold detection level of the second light ray's photo detector. When the light beam is at position "A" the first synchronizing mirror is positioned to not reflect a portion of the focused scanning beam to the second light ray's photo detector that has intensity equal to or greater than the minimum light ray threshold detection level of the second light ray's photo detector. Then when the light beam is again at position "A'" moving toward position "B" the first synchronizing mirror is positioned to intercept a third light ray of the focused scanning beam and reflect at least a portion of the third light ray as a fourth light ray of the focused scanning beam to the second light ray's photo detector, the fourth light ray having an intensity at least equal to the minimum light ray threshold detection level of the second light ray's photo detector. A first recording optical path length is established as measured from the light beam point of origin to the scanning mirror and through the lens and then virtually to the image plane surface when the light beam is at position "A'". A first synchronizing optical path length is established as measured from the light beam point of origin to the scanning mirror and then through the lens and then to the first synchronizing mirror and then to the second light ray's photo detector when the light beam is at position "A'". A second synchronizing mirror is positioned to intercept and reflect at least a portion of the focused scanning beam when the light beam is at a position "B'" that is in the vicinity of position "B" and is between position "A" and position "B". The position is such that as the focused scanning beam approaches position "B" from position "A", when the light beam is at position "B'" the second synchronizing mirror intercepts a fifth light ray of the focused scanning beam and reflects at least a portion of the fifth light ray as a sixth light ray of the focused scanning beam to a photo detector, the sixth light ray having intensity at least equal to the minimum light ray threshold detection level of the sixth light ray's photo detector. When the light beam is at position "B'" the second synchronizing mirror is positioned to not reflect a portion of the focused scanning beam to the sixth light ray's photo detector that is equal to or greater than the minimum light ray threshold detection level of the sixth light ray's photo detector. Then when the light beam is again at the position "B'" moving toward position "A" the second synchronizing mirror is positioned to intercept a seventh light ray of the focused scanning beam and reflect at least a portion of the seventh light ray as an eighth light ray of the focused scanning beam to the sixth light ray's photo detector, the eighth light ray having an intensity at least equal to the minimum light ray threshold detection level of the sixth light ray's photo detector. A second recording optical path length is established as measured from the light beam point of origin to the scanning mirror and then through the lens and then virtually to the image plane surface when the light beam is at position "B'". A second synchronizing optical path length is established as measured from the light beam point of origin to the scanning mirror and then through the lens and then to the second synchronizing mirror and then to the photo detector when the light beam is at position "B'". The first recording optical path length and the first synchronizing optical path length are substantially equal and the second recording optical path length and the second synchronizing optical path length are substantially equal such that the focused scanning beam is focused on both the photo detector and the image plane surface. The scanning system further incorporates an electronic circuit that generates an electronic signal when the photo detection system detects a light ray that is at least equal to the minimum light ray threshold detection level of the photo detection system.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
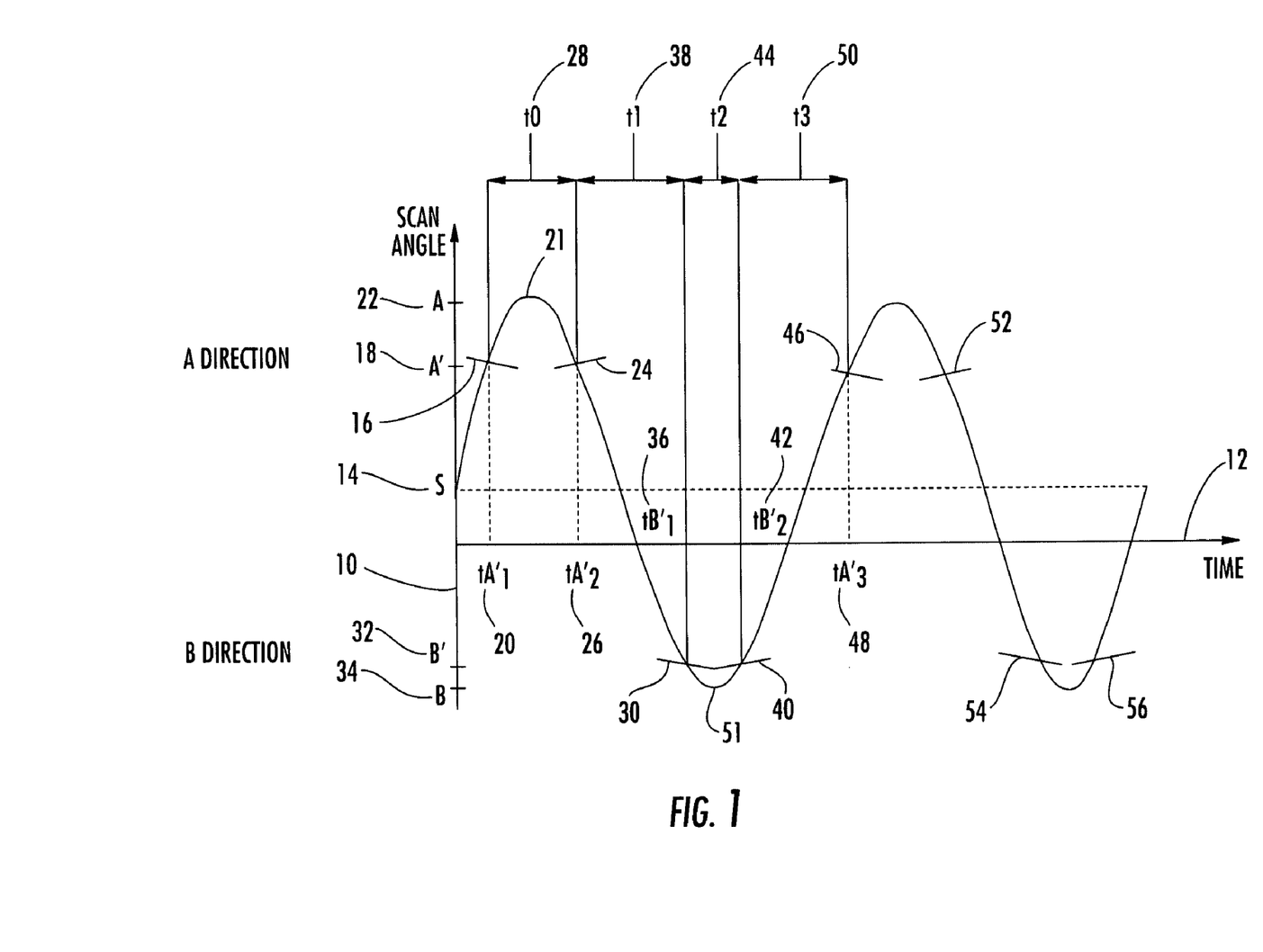
FIG. 1 is a graph that illustrates the scan angle versus time for a scanning system according to the invention.

Various embodiments are described herein that provide electronic signals to synchronize the start and the end of a horizontal scan line in a device, such as an optical scanner or a printer, that use light beams to sweep a field of view, at least in a horizontal direction, and either read or write information along the horizontal scan line. FIG. 1 illustrates a graph of the sinusoidal path over time of an light beam in a printer or scanner as it sinusoidally sweeps horizontally across scan angles in one embodiment of the invention. The scan angle is depicted on the ordinate 10 and time is depicted on the abscissa 12 of the graph. The light beam scan is centered about an axis of symmetry S 14. The light beam scan angle starts at S 14 at time=0 and increases to a first intercept point 16 at scan angle position A' 18 at time $tA'_1$ 20. In preferred embodiments, the light beam is detected by a sensor at scan angle position A' 18 at time 20. The scan angle continues to a first maximum amplitude 21 at position A 22, and then decreases to a second intercept point 24 at time $tA'_2$ 26, where second intercept point 24 is substantially at scan angle position A' 18. The elapsed time between the first intercept point 16 and the second intercept point 24 is t0 28. In preferred embodiments, the light beam is also detected by a sensor at second intercept point 24 (scan angle position A' 18) which occurs at time $tA'_2$ 26. The scan angle continues to decrease passing through the axis of symmetry S 14 to a third intercept point 30 at scan angle position B' 32 at time $tB'_1$ 36. In preferred embodiments, the light beam is also detected by a sensor at intercept point 30 (scan angle position B' 32) occurring at time $tB'_1$ 36. The elapsed time between the second intercept point 24 and the third intercept point 30 is t1 38. The scan angle continues to a minimum amplitude 51 at position B 34 and then begins to increase where it reaches a fourth intercept point 40 at time $tB'_2$ 42, where the fourth intercept point is substantially at scan angle position B' 32. The elapsed time between the third intercept point 30 and the fourth intercept point 40 is t2 44. In preferred embodiments, the light beam is also detected by a sensor at fourth intercept point 40 (scan angle position B' 32) at time $tB'_2$ 42. The scan angle continues to increase until it reaches a fifth intercept point 46 which occurs at time $tA'_3$ 48. In preferred embodiments, the light beam is also detected by a sensor at intercept point 46 (scan angle position A' 18) at time $tA'_3$ 48. The elapsed time between the fourth intercept point 40 and the fifth intercept point 46 is t3 50. The scan angle then continues to a sixth intercept point 52, and seventh intercept point 54, an eighth intercept point 56, and so forth, with the preferred instance continuing of the light beam being detected by a sensor at each intercept point. Time t1 represents a horizontal scan in the direction A to B, and time t3 represents a horizontal scan in the direction B to A.

Figure 2:
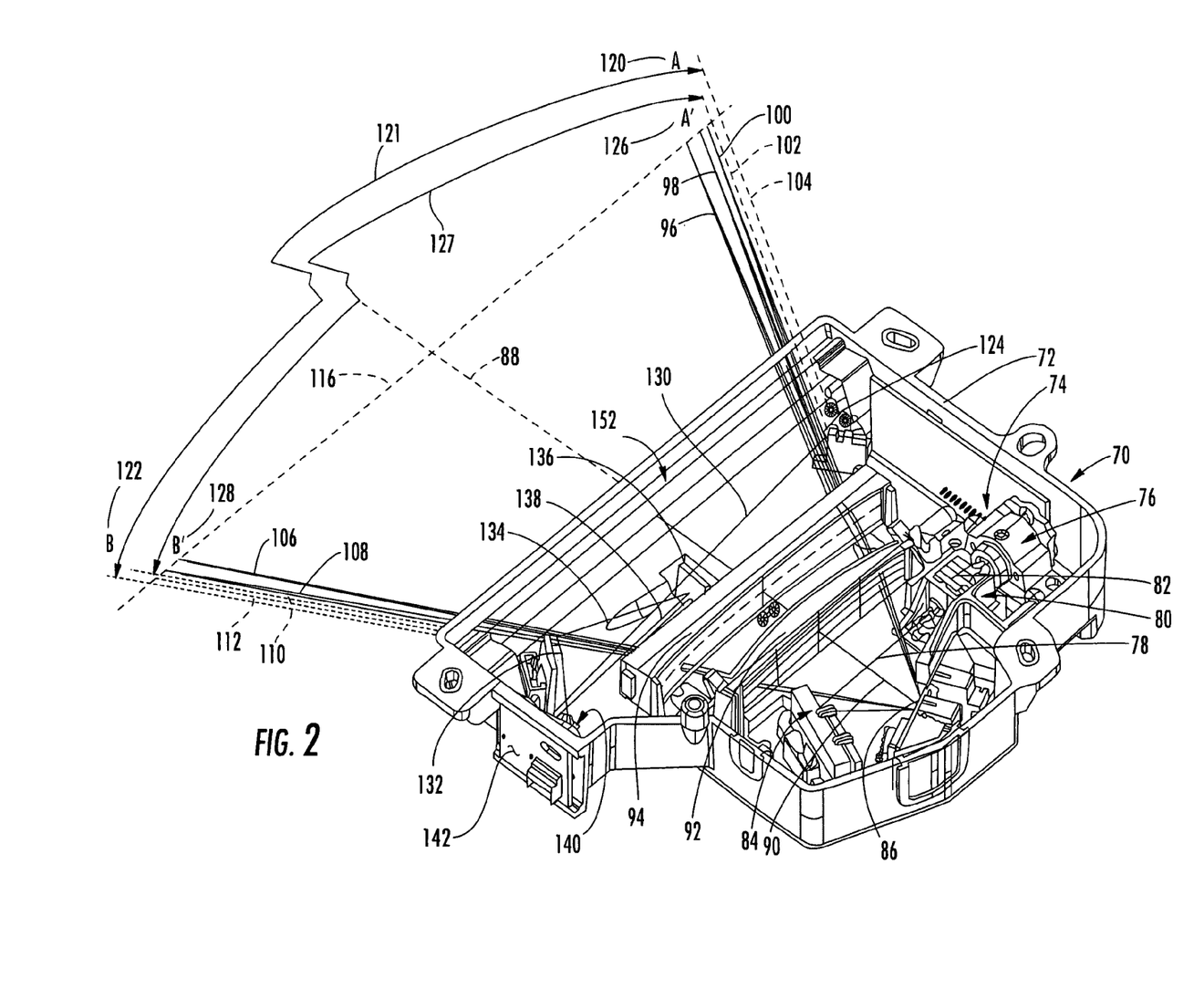
FIG. 2 is perspective and somewhat schematic illustration of a scanning system according to the invention.

FIG. 2 illustrates an embodiment that uses a laser as the light beam in a scanning system. Laser scanning unit 70 incorporates a housing 72 that contains a laser beam source 74. The laser beam source 74 includes a collimation unit 76 that is bolted onto housing 72. The laser beam 78 emanates from a beam point of origin in the laser beam source 74 and exits the collimation unit 76 and passes through a pre-scan lens 80 that is mounted on a pre-scan lens sled 82 that is adjusted to focus the laser beam 78 in the process direction on the image plane 116. The laser beam 78 strikes a pre-scan mirror 84 that reflects the beam onto the torsion oscillator mirrored surface 86. The oscillation of the torsion oscillator sweeps the laser beam into a scan path having an axis of symmetry 88. Thus the laser beam becomes a series of light rays which are segments of the laser beam. A representative light ray 90 is shown leaving torsion oscillator mirrored surface 86 along the axis of symmetry 88 and passing through first f-theta lens F1 92. Light ray 90 then passes through the second f-theta lens F2 94. First f-theta lens F1 92 and second f-theta lens F2 94 are optical elements that may be transmissive or reflective. In this embodiment, one of the functions of first f-theta lens F1 92 and second f-theta lens F2 94 is to focus the light rays (e.g. light ray 90) as a scanning beam on image plane 116. Also, light rays typically will bend as they pass through first f-theta lens F1 92 and second f-theta lens F2 94, but for clarity of illustration in FIGS. 2 and 3, light rays are shown as passing straight through first f-theta lens F1 92 and second f-theta lens F2 94. The depiction of light ray 90 is terminated at the housing 72 in order to not obscure the axis of symmetry 88 with which light ray 90 is co-linear.

As further illustrated in FIG. 2, after exiting the F2 lens 90, light rays are directed toward image plane 116 across a span ranging from a maximum position A 120 to a maximum position B 122, through a maximum scan angle 121. Light rays 96, 98, and 100 are shown as the scan approaches maximum position A 120. However, when the scan angle reaches position A' 126, as represented by light ray 102 (labeled on its virtual extension for clarity), the light ray (102) is intercepted by the A HSYNC mirror 124 and reflected as light ray 130 to the HSYNC photo detection system 140. Light ray 102 is an example of a synchronizing light ray. The HSYNC photo detection system 140 can be seen more clearly in FIG. 3. In the most preferred embodiments the HSYNC photo detection system 140 incorporates a collection lens and a circuit board (142) that incorporates a single PIN photodiode sensor as the photo detector.

To capture a robust signal at the photo detector in the photo detection system 140, it is highly desired to have a focused laser beam illuminate the photo detector. In the most preferred embodiments the focusing of the laser beam onto the photo detector is accomplished by positioning the Sensor A HSYNC mirror 124 and the photo detection system 140 such that two specific optical path lengths related to light ray 102 are substantially equal. The first optical path length is from the light beam point of origin in the laser beam source 74 to the pre-scan mirror 84, and then on to the torsion oscillator mirrored surface 86, and then on through first f-theta lens F1 92 and second f-theta lens F2 94, and then to Sensor A HSYNC mirror 124, and then finally on to the HSYNC photo detection system 140. The second (and equal) optical path length is from the beam point of origin in the laser beam source 74 to the pre-scan mirror 84, and then on to the torsion oscillator mirrored surface 86, and then on through first f-theta lens F1 92 and second f-theta lens F2 94, virtually past Sensor A HSYNC mirror 124 to position A' 126 at the image plane 116. The second optical path length is a "virtual" optical path length because light ray 102 is intercepted by the A HSYNC mirror 124 before it reaches image plane 116. Having these two optical path lengths substantially equal takes advantage of using the focusing function of first f-theta lens F1 92 and second f-theta lens F2 94 (that focuses light rays onto image plane 116) to also cause light rays that are intercepted by the A HSYNC mirror 124 to focus onto the photo detector in the HSYNC photo detection system 140.

As the torsion oscillator mirrored surface 86 continues to oscillate light rays are directed beyond position A' 126 toward maximum scan position A 120, until a light ray, shown as light ray 104 (labeled on its virtual extension) reaches virtual position A 120.

Torsion oscillator mirrored surface 86 then reverses direction and begins to direct light rays toward maximum position B 122. In bi-directional embodiments such as this the information encoded by the printer or scanner has to be constructed in forwards and backwards formats as the bi-directional scanning occurs. Light rays 106 and 108 are shown as scanning approaches maximum position B 122. When the scan angle reaches position B' 128, as represented by light ray 110 (labeled on its virtual extension for clarity), the light ray (110) is intercepted by the B HSYNC mirror 132. Light ray 110 is an example of a synchronizing light ray. Thus it is seen that although torsion oscillator mirrored surface 86 sweeps light rays through a maximum scan angle 121, only light rays of the scanning beam that are within recording scan angle 127 actually reach image plane 116.

Figure 3:
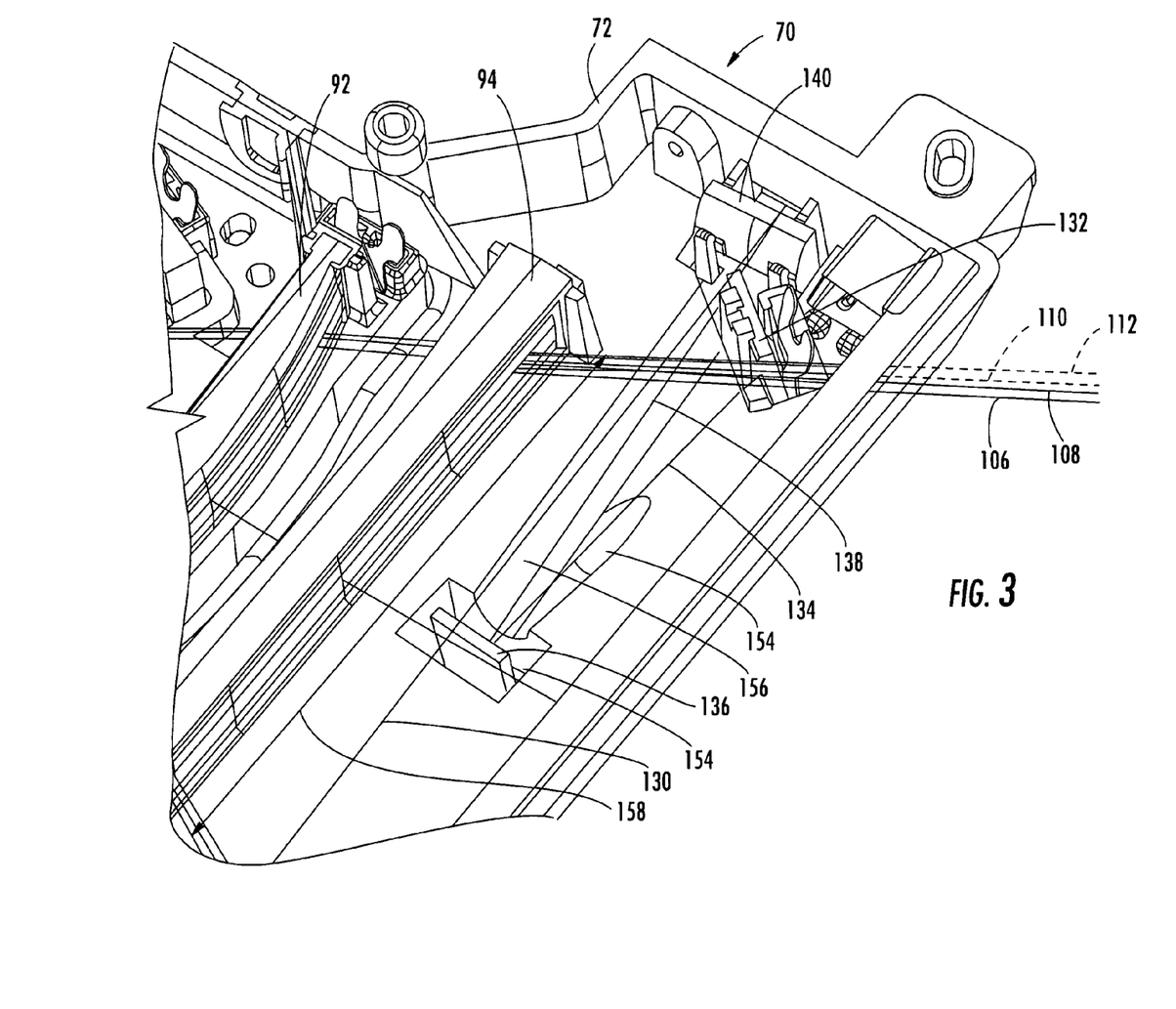
FIG. 3 is a perspective and somewhat schematic illustration of details of a portion of FIG. 2 according to the invention.

Referring to FIG. 3, light ray 110 (again labeled on its virtual extension for clarity) is reflected off of the B HSYNC mirror 132 as light ray 134 onto a B HSYNC folding mirror 136. Note that folding mirror 136 is located in a depression 154 in the laser scanning system housing 72 such that folding mirror 136 is lower than the main laser beam sweep path 158 so that folding mirror 136 does not interfere with the main laser beam sweep path 158 exiting the F2 lens 94 and traveling toward the image plane 116 (as seen in FIG. 2). Achieving proper alignment requires that the B HSYNC mirror 132 be tilted at such an angle that the light ray 134 is reflected off of folding mirror 136 at an angle that is out of the plane of the main laser sweep path 158.

Light ray 134 is reflected off of the B HSYNC folding mirror 136 as light ray 138 back up to the photo detection system 140 which incorporates a photo detector (not shown) mounted on the HSYNC board 142. The B HSYNC folding mirror 136 is mounted at such an angle as to reflect the laser beam 138 back up to the HSYNC photo detection system 140. Note that clearance features 154 and 156 are molded into the housing 72 to insure that the laser beams 134 and 138 are not clipped in any way as they arrive at and leave from folding mirror 136.

To focus light ray 138 as it illuminates the photo detector in photo detection system 140, Sensor B HSYNC mirror 132, B HSYNC folding mirror 136, and the photo detection system 140 are located such that two additional specific optical path lengths related to light ray 110 are substantially equal. The first optical path length is from the light beam point of origin in the laser beam source 74 to the pre-scan mirror 84, and then on to the torsion oscillator mirrored surface 86, and then on through first f-theta lens F1 92 and second f-theta lens F2 94 to B HSYNC mirror 132 and on to B HSYNC folding mirror 136 to the HSYNC photo detection system 140. The second (and equal) optical path length is from the beam point of origin in the laser beam source 74 to the pre-scan mirror 84, and then on to the torsion oscillator mirrored surface 86, and then on through first f-theta lens F1 92 and second f-theta lens F2 94, virtually past Sensor B HSYNC mirror 132 to position B' 128 at the image plane 116. The second optical path length is also a "virtual" optical path length because light ray 110 is intercepted by the B HSYNC mirror 132 before it reaches image plane 116. Having these two optical path lengths substantially equal again takes advantage of using the focusing function of first f-theta lens F1 92 and second f-theta lens F2 94 (that focuses light rays onto image plane 116) to also cause light rays that are intercepted by the B HSYNC mirror 132 to focus onto the photo detector in the HSYNC photo detection system 140.

In alternate embodiments the focusing of the laser beam onto the photo detector of photo detection system 140 may be accomplished at least in part by methods not related to maintaining substantially equal optical path lengths. Instead, for example, again referring to FIGS. 2 and 3, the focusing of the laser beam onto the photo detector of photo detection system 140 may be accomplished by establishing an optical step function in the first f-theta lens 92 or the second f-theta lens 94, or an optical step function in both the first f-theta lens 92 and the second f-theta lens 94. The optical step function operates such that as the scan approaches position A' 126 from the direction of position B' 128, such as depicted by light rays 96, 98, and 100, the first f-theta lens 92 or the second f-theta lens 94 or both first f-theta lens 92 and second f-theta lens 94 operate as a focusing lens system to help focus the light rays onto the image plane 116. However, when the scan reaches position A' 126 an optical step function built into the f-theta lens systems operates such that the light ray 102 is focused on the photo detector in photo detection system 140 without necessarily having the synchronizing path length equal to the virtual path length to the image plane 116. Similarly in such embodiments, as the scan approaches position B' 128 from the direction of position A' 126, such as depicted by light rays 106 and 108, the first f-theta lens 92 or the second f-theta lens 94 or both first f-theta lens 92 and second f-theta lens 94 operate as a focusing lens system to focus the light rays on the image plane 116. However, when the scan reaches position B' 128 an optical step function built into the f-theta lens systems operate such that the light ray 110 is focused on the photo detector in photo detection system 140 without necessarily having the synchronizing path length equal to the virtual path length to the image plane 116. In such embodiments the focusing lens system is referred to as a synch focusing lens.

In other embodiments involving a synch focusing lens, the focusing of the laser beam onto the photo detector is accomplished by optically configuring the A HSYNC mirror 124, the B HSYNC mirror 132, the B HSYNC folding mirror 136, or combinations thereof, to converge or diverge light ray 102 or light ray 110, or both light ray 102 and light ray 110 of the scanning beam such that light ray 102 and light ray 110 are focused on the photo detector in photo detection system 140 without necessarily having both synchronizing path lengths equal to their comparable virtual path lengths to the image plane 116. In such embodiments A HSYNC mirror 124, the B HSYNC mirror 132, or the B HSYNC folding mirror 136 is referred to as a synch focusing lens.

In yet other embodiments, the focusing of the laser beam onto the photo detector is accomplished by adding a focusing lens somewhere in the path of a synchronizing light ray directed to a photo detector. Such a focusing lens would preferably take into account the length of the beam path from the beam point of origin to the focusing lens. For example, a focusing lens may be added in front of the photo detection system 140 to focus either light ray 102 or light ray 110 onto the photo detector in the photo detection system 140. This type of synch focusing lens is discussed in more detail later and illustrated in FIG. 5.

Thus it is seen that these embodiments provide a method of implementing a single HSYNC sensor to detect light rays at both the A' 126 position and the B' 128 position. This embodiment allows for a very compact, yet robust, laser scanning system with the added benefit of the cost reduction that accompanies a reduction in the number of HSYNC mirror and photo detection system components.

The depiction in FIGS. 2 and 3 of maximum position A 120 as being on the right side of laser scanning unit 70 (when looking from torsion oscillator mirrored surface 86 toward image plane 116), and the depiction of maximum position B 122 as being on the left side right side of laser scanning unit 70 (when looking from torsion oscillator mirrored surface 86 toward image plane 116), is arbitrary. That is, maximum position A 120 and associated position A' 126 could be on the left, and maximum position B 122 and associated position B' 128 could be on the right, and the same principles of operation would apply. This feature of alternate left and right orientations is similarly applicable to alternate embodiments also described elsewhere herein. In addition, in some embodiments position A' 126 and maximum position A 120 may be at the same locus. Position B' 128 may be at the same locus as maximum position B 122. In such embodiments, scanning would stop at position A' 126 and position B' 128.

Figure 4:
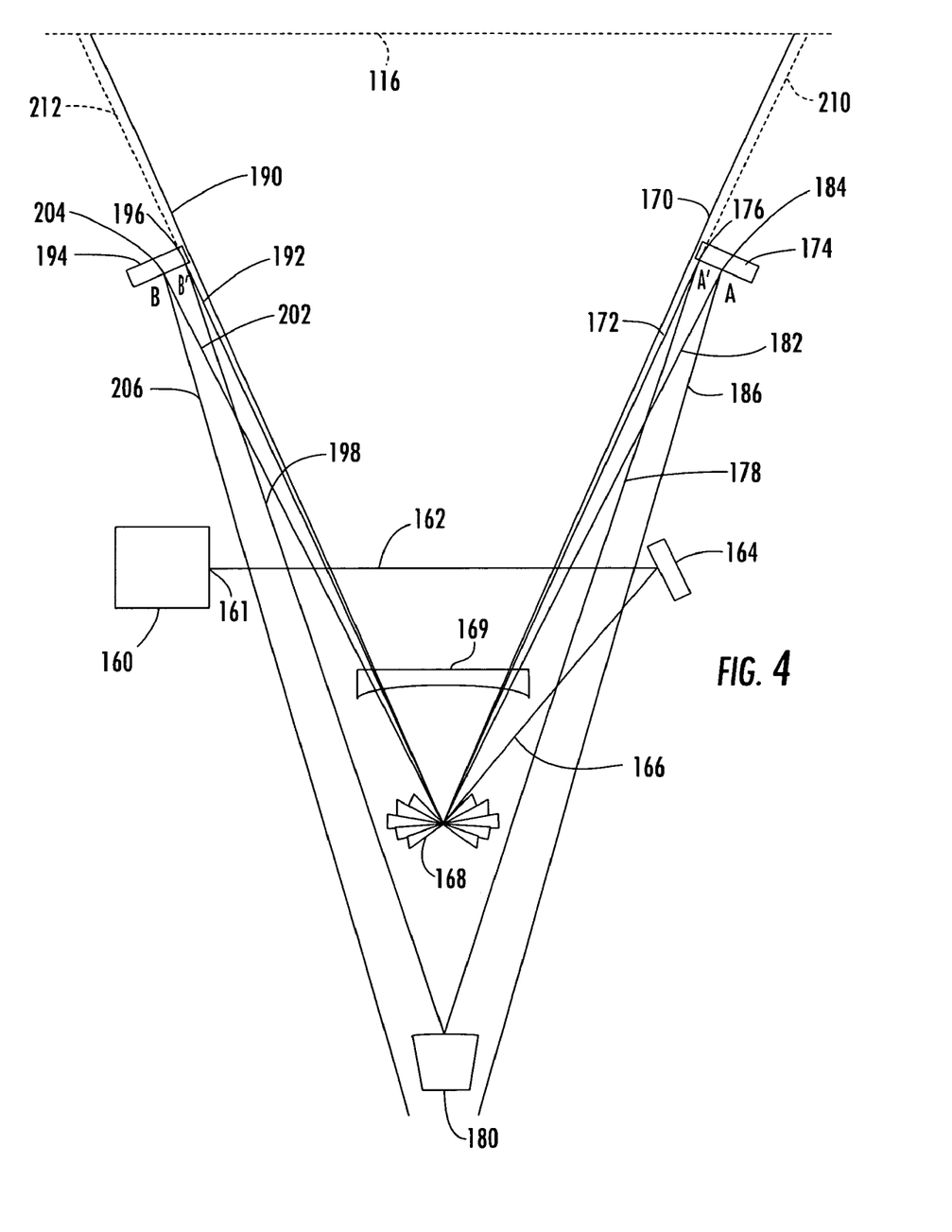
FIG. 4 is a schematic view of a scanning system using a single photo detector according to the invention.

FIG. 4 illustrates an alternate embodiment also utilizing a single photo detection system. A beam source 160 having a light beam point of origin 161 transmits a light beam 162 to a pre-scan mirror 164. In various alternate implementations, light beam 162 may be a laser, or a collimated light beam, or a focused light beam. In the embodiment illustrated, pre-scan mirror 164 reflects substantially all of light beam 162 to scanning mirror 168 as light beam 166. Scanning mirror 168 may, for example, be a Micro Electro-Mechanical System (MEMS) device, or a rotating polygonal mirror. Scanning mirror 168 directs the light beam as a series of light rays (segments of the light beam, as illustrated by light rays 170, 172, 182, 190, 192, and 202), through lens 169 toward image plane 116 as a scanning beam between a maximum position A 184 and a maximum position B 204. While graphically depicted as a single transmissive device in FIG. 4, in alternate embodiments the lens 169 may be a compound lens, or a reflective optical device, or other refraction-type device.

Light ray 170 is shown as scanning approaches maximum position A 184. When the scan angle reaches position A' 176, as represented by light ray 172, the light ray (172) is intercepted by the A HSYNC mirror 174 and is reflected as light ray 178 to the HSYNC photo detection system 180 having a photo detector. This signals the end of transmission of light rays onto image plane 116 for this horizontal scan. When the scan angle reaches maximum position A 184 as represented by light ray 182, the A HSYNC mirror 174 reflects light ray 182 as light ray 186 which, in preferred embodiments, at least partially misses the photo detector in HSYNC photo detection system 180 (in the case depicted here, misses the entire photo detection system) such that the intensity of light that reaches the photo detector in the HSYNC photo detection system 180 is less than the minimum light ray threshold detection level of the photo detector. In preferred embodiments, lens 169 is a focusing lens that focuses the light rays on image plane 116. In the most preferred embodiments, the optical path length from the beam point of origin 161 to pre-scan mirror 164 to scanning mirror 168 along the path of light ray 172 to A HSYCH mirror 174 and on to photo detection system 180 along the path of light ray 178 is equal to the virtual optical path length from the beam point of origin 161 to pre-scan mirror 164 to scanning mirror 168 along the path of light ray 172 to A HSYCH mirror 174 and virtually on to image plane 116 along the path of virtual light ray 210. When lens 169 is a focusing lens, and these two optical path lengths are substantially equal, focusing lens 169 causes light ray 172 that has been intercepted by the A HSYNC mirror 174 to focus onto the photo detector in the HSYNC photo detection system 180.

Continuing with FIG. 4, as the scanning mirror 168 continues to sweep light rays toward image plane 116, light rays are directed beyond position A' 176 toward maximum scan position A 184. Then, if scanning mirror 168 is a uni-directional scanner scanning in the direction B to A, transmission of light rays in the general direction of maximum position A 184 will then cease, and scanning mirror 168 will start to direct the light rays in the direction of maximum position B 204, as represented by light ray 202. Light ray 202 strikes B HSYNC mirror 194 and is reflected toward HSYNC photo detection system 180, but in preferred embodiments, at least partially misses the photo detector in photo detection system (as illustrated by light ray 206 which illustrated here misses the entire photo detection system 180) such that the intensity of light that reaches the photo detector in the HSYNC photo detection system 180 is less than the minimum light ray threshold detection level of the photo detector. Scanning mirror 168 then continues to direct light rays in a scanning direction that is moving toward position B' 196. When a light ray, such as light ray 192 reaches position B' 196, it is reflected by B HSYNC mirror 194 as light ray 198 to HSYNC photo detection system 180. This signals the start of scanning onto image plane 116 for the next scan line. Scanning proceeds as scanning mirror 168 sweeps light rays to position A' 176 which signals the end of the scan line, and the repeat of the process starting at A' 176 which was previously described.

If scanning mirror 168 is a bi-directional scanner, after light rays are directed toward maximum scan position A 184, scanning mirror 168 then reverses direction and begins to sweep the light rays toward maximum position B 204. In bi-directional embodiments such as this the information encoded by the printer or scanner has to be constructed in forwards and backwards formats as the bi-directional scanning occurs. Light ray 190 is shown as scanning approaches maximum position B 204. When the scan angle reaches position B' 196, as represented by light ray 192, the light ray (192) is intercepted by the B HSYNC mirror 194 and reflected as light ray 198 to the HSYNC photo detection system 180 having a photo detector. This signals the end of transmission of light rays onto image plane 116 for this horizontal scan. When the scan angle reaches maximum position B 204 as represented by light ray 202, the B HSYNC mirror 194 reflects light ray 202 as light ray 206 which, in preferred embodiments, at least partially misses the HSYNC photo detection system 180 such that the intensity of light that reaches the photo detector in the HSYNC photo detection system 180 is less than the minimum light ray threshold detection level of the photo detector. In preferred embodiments, lens 169 is a focusing lens that focuses the light rays as a scanning beam on image plane 116. In the most preferred embodiments, the optical path length from the beam point of origin 161 to pre-scan mirror 164 to scanning mirror 168 along the path of light ray 192 to B HSYCH mirror 194 and on to photo detection system 180 along the path of light ray 198 is equal to the virtual optical path length from the beam point of origin 161 to pre-scan mirror 164 to scanning mirror 168 along the path of light ray 192 to B HSYCH mirror 194 and virtually on to image plane 116 along the path of virtual light ray 212. When lens 169 is a focusing lens, and these two optical path lengths are substantially equal, focusing lens 169 causes light ray 192 that has been intercepted by the B HSYNC mirror 194 to focus onto the photo detector in the HSYNC photo detection system 180.

In alternate embodiments the focusing of the laser beam onto the photo detector of photo detection system 180 may be accomplished at least in part by methods not related to maintaining substantially equal optical path lengths. Instead, for example, again referring to FIG. 4, the focusing of the laser beam onto the photo detector of photo detection system 180 may be accomplished by establishing an optical step function in lens 169. The optical step function operates such that as the scan approaches position A' 176 from the direction of position B' 196, such as depicted by light ray 170, lens 169 operates as a focusing lens to focus the light rays on the image plane 116. However, when the scan reaches position A' 176 an optical step function built into lens 169 operates such that the light ray 172 (when reflected by A HSYNC mirror 174 as light ray 178) is focused on the photo detector in photo detection system 180 without necessarily having the synchronizing path length equal to the virtual path length to the image plane 116. Similarly, as the scan approaches position B' 196 from the direction of position A' 176, such as depicted by light ray 190, the lens 169 operates as a focusing lens to focus the light rays on the image plane 116. However, when the scan reaches position B' 196 an optical step function built into lens 169 operates such that the light ray 192 (when reflected by B HSYNC mirror 194 as light ray 198) is focused on the photo detector in photo detection system 180 without necessarily having the synchronizing path length equal to the virtual path length to the image plane 116. In such embodiments lens 169 is referred to a synch focusing lens.

In other embodiments, the focusing of the laser beam onto the photo detector is accomplished by optically configuring the A HSYNC mirror 174 or the B HSYNC mirror 194, or both, to converge or diverge light ray 172 or light ray 192 respectively, or both light ray 172 and light ray 192 respectively, which are considered examples of synchronizing light rays, such that light ray 172 and light ray 192 are focused on the photo detector in photo detection system 180 without necessarily having both synchronizing path lengths equal to their comparable virtual path lengths to the image plane 116. In such embodiments (where optically configured to converge or diverge a light ray) A HSYNC mirror 174 or the B HSYNC mirror 194 is (are) referred to a synch focusing lens.

In yet other embodiments, the focusing of the laser beam onto the photo detector is accomplished by adding an additional synch focusing lens somewhere in the path of a synchronizing light ray directed to the photo detector. Such a synch focusing lens would preferably take into account the length of the beam path from the beam point of origin to the focusing lens. For example, a synch focusing lens could be added just in front of the photo detection system 180 to focus the synchronizing light rays onto the photo detector in the photo detection system 180.

Finally, with reference to FIG. 4, in some embodiments position A' 176 and maximum position A 174 may be at the same locus. Position B' 196 may be at the same locus as maximum position B 194. In such embodiments, scanning would stop at position A' 176 and position B' 196.

Figure 5:
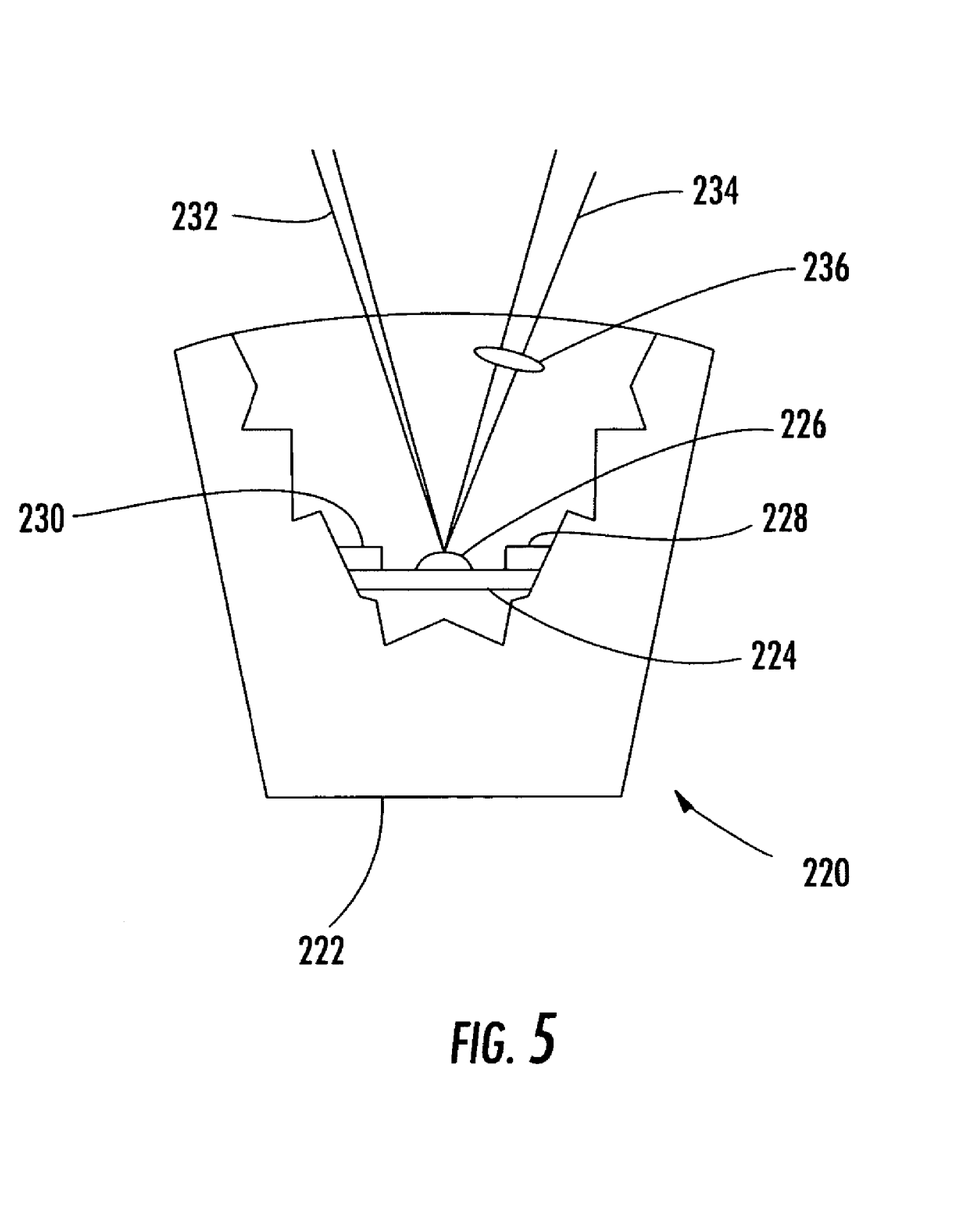
FIG. 5 is a partial cutaway schematic view of a photo detection system according to the invention.

FIG. 5 illustrates details of some embodiments of a photo detection system 220. A housing 222 supports a circuit board 224 upon which is mounted photo detector 226. Also mounted on circuit board 224 are electronic components 228 and 230 which form an electronic circuit that generates an electronic signal when the photo detection system detects a light ray that is at least equal to the minimum light ray threshold detection level of the photo detector. A first synchronizing light ray 232, shown in expanded scale to illustrate its focus, is focused on photo detector 226. A second synchronizing light ray 234, also shown in expanded scale to illustrate its focus, would not be focused on photo detector 226 except that synch focusing lens 236 intercepts synchronizing light ray 234 and focuses it on photo detector 226. In some embodiments, multiple photo detectors may be applied to form a photo detection system, and each photo detectors may have its own electronic circuit or several photo detectors may utilize at least in part a common electronic circuit to generate an electronic signal when a photo detector detects a light ray that is at least equal to the minimum light ray threshold detection level of the photo detector. When multiple photo detectors are used as a photo detection system, the lowest minimum light ray threshold detection level among the multiple photo detectors is referred to as the minimum light ray threshold detection level of the photo detection system.

Figure 6:
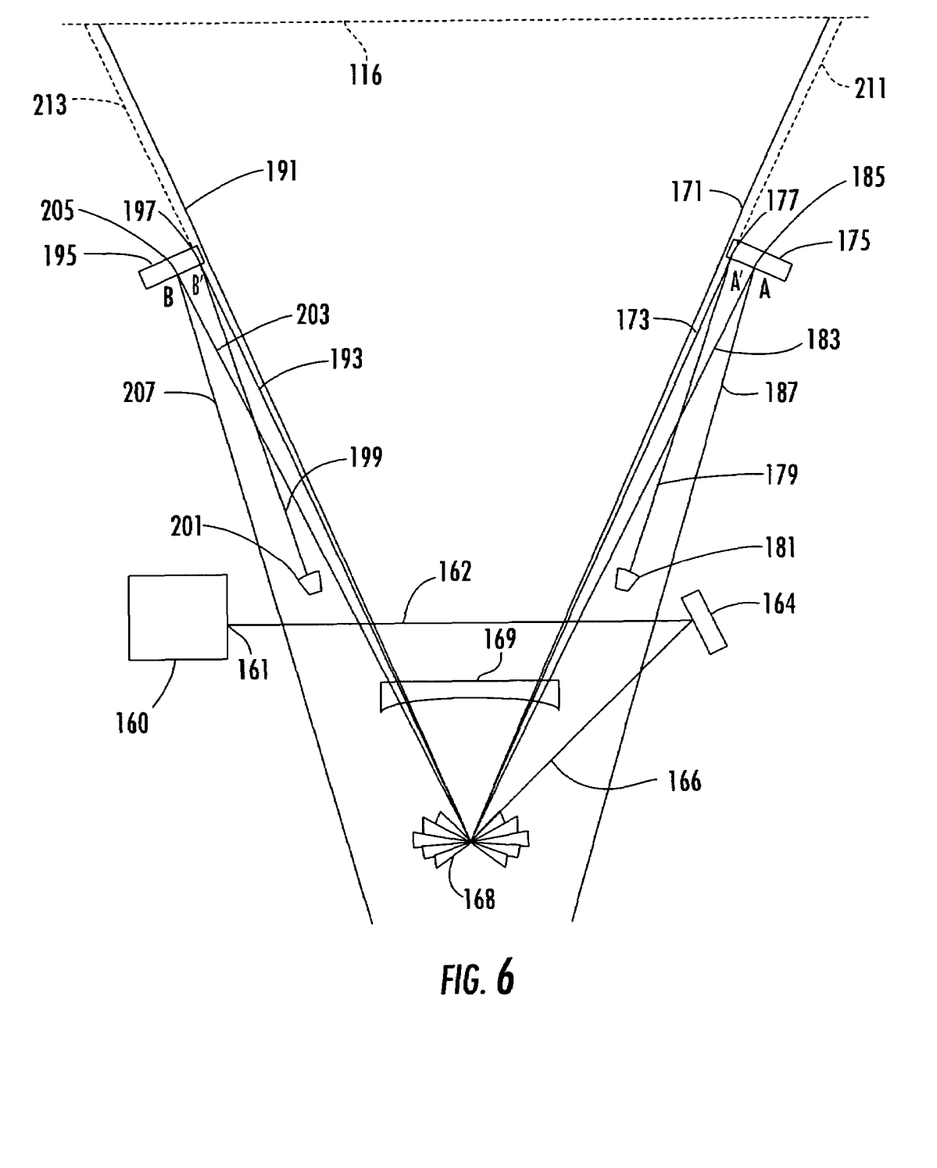
FIG. 6 is a schematic view of a scanning system using two photo detectors according to the invention.

FIG. 6 illustrates an alternate embodiment utilizing two photo detection systems. A beam source 160 having a light beam point of origin 161 transmits a light beam 162 to a pre-scan mirror 164. In various alternate implementations, light beam 162 may be a laser, or a collimated light beam, or a focused light beam. Pre-scan mirror 164 reflects substantially all of light beam 162 to scanning mirror 168 as light beam 166. Scanning mirror 168 may, for example, be a Micro Electro-Mechanical System (MEMS) device, or a rotating polygonal mirror. Scanning mirror 168 directs light rays (segments of the light beam, represented by light rays 171, 173, 183, 191, 193, and 203) through lens 169 toward image plane 116 as a scanning beam from a maximum position A 185 to a maximum position B 205. As in FIG. 4, for clarity of illustration light rays are shown following a straight path through lens 169 in FIG. 6, but in practice light rays would typically bend as they pass through lens 169.

Light ray 171 is shown as scanning approaches maximum position A 185. When the scan angle reaches position A' 177, as represented by light ray 173, the light ray (173) is intercepted by the A HSYNC mirror 175 and is reflected as light ray 179 to the A HSYNC photo detection system 181 having a photo detector. This signals the end of transmission of light rays onto image plane 116 for this horizontal scan. When the scan angle reaches position A 185 as represented by light ray 183, the A HSYNC mirror 175 reflects light ray 183 as light ray 187 which, in preferred embodiments, at least partially misses the photo detector in A HSYNC photo detection system 181 (as illustrated here misses the entire photo detection system 181) such that the intensity of light that reaches the photo detector in the A HSYNC photo detection system 181 is less than the minimum light ray threshold detection level of the photo detector. In preferred embodiments, lens 169 is a focusing lens that focuses the light rays as a scanning beam on image plane 116. In the most preferred embodiments, the optical path length from the beam point of origin 161 to pre-scan mirror 164 to scanning mirror 168 along the path of light ray 173 to A HSYCH mirror 175 and on to photo detection system 181 along the path of light ray 179 is equal to the virtual optical path length from the beam point of origin 161 to pre-scan mirror 164 to scanning mirror 168 along the path of light ray 173 to A HSYCH mirror 175 and virtually on to image plane 116 along the path of virtual light ray 211. When lens 169 is a focusing lens, and these two optical path lengths are substantially equal, focusing lens 169 causes light ray 173 that has been intercepted by the A HSYNC mirror 175 to focus onto the photo detector in the HSYNC photo detection system 181.

As the scanning mirror 168 continues to sweep light rays toward image plane 116, light rays are directed beyond position A' 177 toward maximum scan position A 185. Then, if scanning mirror 168 is a uni-directional scanner, transmission of light rays in the general direction of maximum position A 185 will then cease, and scanning mirror 168 will start to direct the light rays in the general direction of maximum position B 205, as represented by light ray 203. Light ray 203 strikes B HSYNC mirror 195 and is reflected toward HSYNC photo detection system 180, but in preferred embodiments, at least partially misses the photo detector in the HSYNC photo detection system 180 (as illustrated by light ray 207 which misses the entire photo detection system 180) such that the intensity of light that reaches the photo detector in the HSYNC photo detection system 180 is less than the minimum light ray threshold detection level of the photo detector. Scanning mirror 168 then continues to direct light rays in a scanning direction that that is moving toward position B' 197. When a light ray, such as light ray 193 shown in FIG. 6 reaches position B' 197, it is reflected by B HSYNC mirror 195 to B HSYNC photo detection system 201. This signals the start of scanning onto image plane 116 for the next scan line. Scanning proceeds as scanning mirror 168 sweeps light rays to position A' 177 which signals the end of the scan line, and the repeat of the process starting at A' 177 which was previously described.

If scanning mirror 168 is a bi-directional scanner, after light rays are directed toward maximum scan position A 185, scanning mirror 168 then reverses direction and begins to sweep the light rays to maximum position B 205. In bi-directional embodiments such as this the information encoded in the printer or scanner has to be constructed in forwards and backwards formats as the bi-directional scanning occurs. Light ray 191 is shown as scanning approaches maximum position B 205. However, when the scan angle reaches position B' 197, as represented by light ray 193, the light ray (193) is intercepted by the B HSYNC mirror 195 and reflected as light ray 199 to the B HSYNC photo detection system 201 having a photo detector. This signals the end of transmission of light rays onto image plane 116 for this horizontal scan. When the scan angle reaches position B 205 as represented by light ray 203, the B HSYNC mirror 195 reflects light ray 203 as light ray 207 which, in preferred embodiments, at least partially misses the B HSYNC photo detection system 201 such that the intensity of light that reaches the photo detector in the B HSYNC photo detection system 201 is less than the minimum light ray threshold detection level of the photo detector. In preferred embodiments, lens 169 is a focusing lens that focuses the light rays as a scanning beam on image plane 116. In the most preferred embodiments, the optical path length from the beam point of origin 161 to pre-scan mirror 164 to scanning mirror 168 along the path of light ray 193 to B HSYCH mirror 195 and on to photo detection system 201 along the path of light ray 199 is equal to the virtual optical path length from the beam point of origin 161 to pre-scan mirror 164 to scanning mirror 168 along the path of light ray 193 to B HSYCH mirror 195 and virtually on to image plane 116 along the path of virtual light ray 213. When lens 169 is a focusing lens, and these two optical path lengths are substantially equal, focusing lens 169 causes light ray 193 that has been intercepted by the B HSYNC mirror 195 to focus onto the photo detector in the B HSYNC photo detection system 201.

In alternate embodiments the focusing of the laser beam onto the photo detector of photo detection system 181 or 201 may be accomplished at least in part by methods not related to maintaining substantially equal optical path lengths. Instead, for example, again referring to FIG. 6, the focusing of the laser beam onto the photo detector of photo detection system 181 may be accomplished by establishing an optical step function in lens 169. The optical step function operates such that as the scan approaches position A' 177 from the direction of position B' 197, such as depicted by light ray 171, lens 169 operates as a focusing lens to focus the light rays on the image plane 116. However, when the scan reaches position A' 177 an optical step function built into lens 169 operates such that the light ray 173 reflected a light ray 179 is focused on the photo detector in photo detection system 181 without necessarily having the synchronizing path length equal to the virtual path length to the image plane 116. Similarly, as the scan approaches position B' 197 from the direction of position A' 177, such as depicted by light ray 191, the lens 169 operates as a focusing lens to focus the light rays on the image plane 116. However, when the scan reaches position B' 197 an optical step function built into lens 169 operates such that the light ray 193 reflected as light ray 199 is focused on the photo detector in photo detection system 201 without necessarily having the synchronizing path length equal to the virtual path length to the image plane 116. In such embodiments, lens 169 is referred to a synch focusing lens.

In other embodiments, the focusing of the laser beam onto the photo detector is accomplished by optically configuring the A HSYNC mirror 175 or the B HSYNC mirror 195, or both, to converge or diverge light ray 173 or light ray 193 respectively, or both light ray 173 and light ray 193 respectively, which are considered examples of synchronizing light rays, such that light ray 172 reflected as light ray 173 and light ray 192 reflected as light ray 193 are focused on the photo detectors in photo detection systems 181 and 201 respectively without necessarily having both synchronizing path lengths equal to their comparable virtual path lengths to the image plane 116. In such embodiments A HSYNC mirror 175 or the B HSYNC mirror 195 is referred to a synch focusing lens.

In yet other embodiments, the focusing of the laser beam onto the photo detector is accomplished by adding a focusing lenses somewhere in the path of a synchronizing light ray directed to a photo detector. Such a focusing lens would preferably take into account the length of the beam path from the beam point of origin to the focusing lens. For example, a focusing lens could be added just in front of the photo detection system 181 to focus the synchronizing light rays onto the photo detector in the photo detection system 181 and a second focusing lens could be added just in front of the photo detection system 201 to focus the synchronizing light rays onto the photo detector in the photo detection system 201.

Finally, with reference to FIG. 6, in some embodiments position A' 177 and maximum position A 185 may be at the same locus. Position B' 197 may be at the same locus as maximum position B 205. In such embodiments, scanning would stop at position A' 177 and position B' 197.

In designing an effective scanning unit it is constructive to ensure that the minimum light sensitivity of the photo detector system, the illumination power of the light source, and the reflectivity coefficient of each mirror surface are compatible such that under worst-case conditions a ray of light that reaches the photo detection system for the purpose of detection is of sufficient power to trigger the photo detector sensor in the photo detection system. Scanning synchronization also requires the photo detector in a photo detection system be connected to an electronic circuit that generates an electronic signal when the photo detection system detects a light ray that is at least equal to the minimum light ray threshold detection level of the photo detection system.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A scanning system comprising:
   a beam source producing a light beam;
   a scanning mirror that receives the light beam from the beam source and sweeps the light beam from a position "A" to a position "B";
   a lens that receives the light beam from the scanning mirror as the scanning mirror sweeps the light beam from position "A" to position "B" and that directs the light beam as a scanning beam to an image plane surface;
   a photo detection system having at least one photo detector and having a minimum light ray threshold detection level;
   a first synchronizing mirror positioned to intercept and reflect at least a portion of the scanning beam as a synchronizing light ray when the light beam is at a position "A'" that is in the vicinity of position "A" and that is between position "A" and position "B" such that when the light beam is at position "A'" the first synchronizing mirror intercepts a first light ray of the scanning beam and reflects at least a portion of the first light ray as a second light ray of the scanning beam to a first single photo detector of the photo detection system, where the intensity of the second light ray of the scanning beam is at least equal to the minimum light ray threshold detection level of the first single photo detector of the photo detection system;

a second synchronizing mirror positioned to intercept and reflect at least a portion of the scanning beam as a synchronizing light ray when the light beam is at a position "B'" that is in the vicinity of position "B" and that is between position "A" and position "B" such that when the light beam is at position "B'" the second synchronizing mirror intercepts a third light ray of the scanning beam and reflects at least a portion of the third light ray as a fourth light ray of the scanning beam to a folding mirror that is positioned to reflect at least a portion of the fourth light ray as a fifth light ray of the scanning beam to the first single photo detector of the photo detection system, where the intensity of the fifth light ray of the scanning beam is at least equal to the minimum light ray threshold detection level of the photo detection system; and an electronic circuit that generates an electronic signal when the photo detection system detects a light ray that is at least equal to the minimum light ray threshold detection level of the first single photo detector of the photo detection system.

2. The scanning system of claim 1 further comprising:
a synch focusing lens that intercepts at least one synchronizing light ray and focuses the at least one synchronizing light ray onto the first single photo detector.

3. The scanning system of claim 1 wherein:
the beam source has a light beam point of origin;
the lens is a focusing lens that focuses the light beam as a focused scanning beam on the image plane surface;
a first recording optical path length is established as measured from the light beam point of origin to the scanning mirror and through the lens and then virtually to the image plane surface when the light beam is at position "A", and a second recording optical path length is established as measured from the light beam point of origin to the scanning mirror and then through the lens and then virtually to the image plane surface when the light beam is at position "B";
a first synchronizing optical path length is established as measured from the light beam point of origin to the scanning mirror and then through the lens and then to the first synchronizing mirror and then to the photo detection system when the light beam is at position "A'", and a second synchronizing optical path length is established as measured from the light beam point of origin to the scanning mirror and then through the lens and then to the second synchronizing mirror and then to the folding mirror and then to the photo detection system when the light beam is at position "B'"; and
the first recording optical path length and the first synchronizing optical path length are substantially equal and the second recording optical path length and the second synchronizing optical path length are substantially equal.

4. The scanning system of claim 1 wherein the scanning mirror that sweeps the light beam from position "A" to position "B" subsequently sweeps the light beam from position "B" to substantially position "A".

5. The scanning system of claim 1 wherein the scanning mirror comprises a MEMS torsion oscillator.

6. The scanning system of claim 1, further comprising a pre-scan mirror that receives the light beam from the beam source and reflects substantially all of the light beam to the scanning mirror.

7. The scanning system of claim 2 wherein the scanning mirror that sweeps the light beam from position "A" to position "B" subsequently sweeps the light beam from position "B" to substantially position "A."

8. The scanning system of claim 2 wherein the scanning mirror comprises a MEMS torsion oscillator.

9. The scanning system of claim 2 further comprising a pre-scan mirror that receives the light beam from the beam source and reflects substantially all of the light beam to the scanning mirror.

10. The scanning system of claim 3 wherein the scanning mirror that sweeps the light beam from position "A" to position "B" subsequently sweeps the light beam from position "B" to substantially position "A."

11. The scanning system of claim 3 wherein the scanning mirror comprises a MEMS torsion oscillator.

12. The scanning system of claim 3 further comprising a pre-scan mirror that receives the light beam from the beam source and reflects substantially all of the light beam to the scanning mirror.

13. A scanning system comprising:
a beam source producing a light beam;
a scanning mirror that receives the light beam from the beam source and sweeps the light beam from a position "A" to a position "B";
a lens that receives the light beam from the scanning mirror as the scanning mirror sweeps the light beam from position "A" to position "B" and that directs the beam as a scanning beam to an image plane surface;
a single photo detector having a minimum light ray threshold detection level;
a first synchronizing mirror positioned to intercept and reflect at least a portion of the scanning beam when the light beam is at a position "A'" that is in the vicinity of position "A" and that is between position "A" and position "B" such that when the light beam is in position "A'" the first synchronizing mirror intercepts a first light ray of the scanning beam and reflects at least a portion of the first light ray as a second light ray of the scanning beam to the photo detector without passing through the lens, where the intensity of the second light ray of the scanning beam is at least equal to the minimum light ray threshold detection level of the photo detector;
a second synchronizing mirror positioned to intercept and reflect at least a portion of the scanning beam when the light beam is at a position "B'" that is in the vicinity of position "B" and that is between position "A" and position "B" such that when the light beam is at position "B'" the second synchronizing mirror intercepts a third light ray of the scanning beam and reflects at least a portion of the third light ray as a fourth light ray of the scanning beam to the photo detector, where the intensity of the fourth light ray of the scanning beam is at least equal to the minimum light ray threshold detection level of the photo detector;
the distance from the first synchronizing mirror to the single photo detector being substantially equal to the distance from the second synchronizing mirror to the single photo detector, and
an electronic circuit that generates an electronic signal when the photo detector detects a light ray that is at least equal to the minimum light ray threshold detection level of the photo detector.

14. The scanning system of claim 13 further comprising:
a synch focusing lens that intercepts at least one synchronizing light ray and focuses the at least one synchronizing light ray onto the photo detector.

15. The scanning system of claim 13 wherein:

the beam source has a light beam point of origin;

the lens is a focusing lens that focuses the light beam as a focused scanning beam to the image plane surface;

a first recording optical path length is established as measured from the light beam point of origin to the scanning mirror and then through the lens and then virtually to the image plane surface when the light beam is at position "A'", and a second recording optical path length is established as measured from the light beam point of origin to the scanning mirror and then through the lens and then virtually to the image plane surface when the light beam is at position "B'";

a first synchronizing optical path length is established as measured from the light beam point of origin to the scanning mirror and then through the lens and then to the first synchronizing mirror and then to the photo detector when the light beam is at position "A'", and a second synchronizing optical path length is established as measured from the light beam point of origin to the scanning mirror and then through the lens and then to the second synchronizing mirror and then to the photo detector when the light beam is at position "B'"; and the first recording optical path length and the first synchronizing optical path length are substantially equal and the second recording optical path length and the second synchronizing optical path length are substantially equal.

16. The scanning system of claim 13 wherein the scanning mirror that sweeps the light beam from position "A" to position "B" subsequently sweeps the light beam from position "B" to substantially position "A."

17. The scanning system of claim 13 wherein the scanning mirror comprises a MEMS torsion oscillator.

18. The scanning system of claim 13, further comprising a pre-scan mirror that receives the light beam from the beam source and reflects substantially all of the light beam to the scanning mirror.

19. The scanning system of claim 14 wherein the scanning mirror that sweeps the light beam from position "A" to position "B" subsequently sweeps the light beam from position "B" to substantially position "A."

20. The scanning system of claim 14 wherein the scanning mirror comprises a MEMS torsion oscillator.

21. The scanning system of claim 14, further comprising a pre-scan mirror that receives the light beam from the beam source and reflects substantially all of the light beam to the scanning mirror.

22. The scanning system of claim 15 wherein the scanning mirror that sweeps the light beam from position "A" to position "B" subsequently sweeps the light beam from position "B" to substantially position "A."

23. The scanning system of claim 15 wherein the scanning mirror comprises a MEMS torsion oscillator.

24. The scanning system of claim 15, further comprising a pre-scan mirror that receives the light beam from the beam source and reflects substantially all of the light beam to the scanning mirror.

25. A scanning system comprising:

a beam source producing a light beam;

a scanning mirror that receives the light beam from the beam source and sweeps the light beam between positions "A" and "B";

a photo detection system having a single photo detector;

a first synchronizing mirror positioned to intercept and reflect at least a portion of the ligth beam as a synchronizing light ray when the light beam is at a position "A'" that is in the vicinity of position "A" such that when the light beam is at position "A'" the first synchronizing mirror intercepts a first light ray of the scanning beam and reflects at least a portion of the first light ray as a second light ray of the scanning beam to the photo detector;

a second synchronizing mirror positioned to intercept and reflect at least a portion of the scanning beam as a synchronizing light ray when the light beam is at a position "B'" that is in the vicinity of position "B" such that when the light beam is at position "B'" the second synchronizing mirror intercepts a third light ray of the scanning beam and reflects at least a portion of the third light ray as a fourth light ray of the scanning beam to the photo detector;

the second and fourth light rays having travel directions that are inward with respect to the first and second synchronizing mirrors such that the second and fourth light rays are spaced closer together as the beams initially travel away from the first and second mirrors; and an electronic circuit that generates an electronic signal when the photo detection system detects a light ray.

26. The scanning system of claim 25 wherein the scanning mirror comprises a MEMS torsion oscillator.

* * * * *